United States Patent [19]

Parmet et al.

[11] Patent Number: 4,595,997
[45] Date of Patent: Jun. 17, 1986

[54] QUEUE SYMBOL FIELD RECOVERY FLAGS FOR DEFINING BOUNDARIES OF ONE OR MORE FIELDS OF A DOCUMENT READ BY A READER SORTER

[75] Inventors: Arthur A. Parmet, Burlington; Charles W. Dawson, East Bridgewater, both of Mass.

[73] Assignee: Honeywell Information Systems Inc., Waltham, Mass.

[21] Appl. No.: 574,631

[22] Filed: Jan. 9, 1984

Related U.S. Application Data

[63] Continuation of Ser. No. 98,274, Nov. 28, 1979, abandoned.

[51] Int. Cl.[4] .............................................. G06F 9/00
[52] U.S. Cl. ..................................................... 364/900
[58] Field of Search ................................. 364/200, 900

[56] References Cited

U.S. PATENT DOCUMENTS

| | | | |
|---|---|---|---|
| 3,959,777 | 5/1976 | Kimmel | 364/900 |
| 4,003,033 | 1/1977 | O'Keefe et al. | 364/200 |
| 4,016,549 | 4/1977 | Hutner | 364/900 |
| 4,104,718 | 8/1978 | Poublan et al. | 364/200 |
| 4,201,978 | 5/1980 | Nally | 340/146.3 D |

*Primary Examiner*—Gareth D. Shaw
*Assistant Examiner*—John G. Mills, III
*Attorney, Agent, or Firm*—George Grayson; John S. Solakian

[57] ABSTRACT

A Reader/Sorter may have an MICR read head, an OMR read head, and two OCR read heads or a combination thereof.

A Reader/Sorter Adapter receives characters read by the Reader/Sorter. The characters include data and formatting symbol characters read from a document and control characters generated by the Reader/Sorter. Certain characters may be identified as queue field identifiers (QFI) by the user via software. These are usually the formatting characters. The control characters are identified as pseudo queue field identifiers (PQFI). QFI and PQFI characters are received by a Multiple Device Controller and allow the firmware to identify the length of the data fields, the head from which the characters were received, and any special conditions associated with reading of a data field.

12 Claims, 8 Drawing Figures

CONTENTS OF PROMS 114 AND 116

HEAD 1 (MICR)

| CHARACTERS | ADDRESS LOC. (HEX)<br>XLTQD1-3+00 (512-128)<br>RSDAT1-7+00 (64-1) | CONTENTS<br>DATDC0-7+00 |
|---|---|---|
| SOD | 002 | 82 |
| DASH | 020 | 10 |
| SYMBOL | 023 | 20 |
| SYMBOL | 024 | 20 |
| DASH | 02D | 10 |
| NUMERIC | 030-039 | 04 |
| TRANSIT SYMBOL | 03C | 08 |
| CAN"T READ | 03F | 40 |
| MICR HEAD ID | 060 | A0 |
| RA2 (MICR) | 062 | E0 |
| OMR HEAD ID | 068 | 90 |
| OCR 3 HEAD ID | 070 | 88 |
| RA2 (OCR 3) | 072 | C8 |
| OCR 4 HEAD ID | 078 | 84 |
| RA2 (OCR 4) | 07A | C4 |
| FIELD FORMAT ERROR | 07C | 01 |
| EOD | 07F | 81 |
| UNUSED LOCATION |  | 00 |

HEAD 2 (OMR)

| CAN'T READ | 0C0-0E1 | 40 |
|---|---|---|
| MISSING TIMING MARK | 0E2 | 60 |
| CAN'T READ | 0E3-0E7 | 40 |
| OMR HEAD ID | 0E8 | 90 |
| CAN'T READ | 0E9-0EF | 40 |
| OCR 3 HEAD ID | 0F0 | 88 |
| CAN'T READ | 0F1 | 40 |
| RA2 (OCR 3) | 0F2 | C8 |
| CAN'T READ | 0F3-0F7 | 40 |
| OCR 4 HEAD ID | 0F8 | 84 |
| CAN'T READ | 0F9 | 40 |
| RA2 (OCR 4) | 0FA | C4 |
| CAN'T READ | 0FB | 40 |
| FIELD FORMAT ERROR | 0FC | 01 |
| CAN'T READ | 0FD-0FE | 40 |
| EOD | 0FF | 81 |
| UNUSED LOCATION |  | 00 |

CONTENTS OF PROMS 114 AND 116

HEAD 3 (OCR 3)

| CHARACTERS | ADDRESS LOC. (HEX)<br>XLTQD1-3+00 (512-128)<br>RSDAT1-7+00 (64-1) | CONTENTS<br>DATDC0-7+00 |
|---|---|---|
| SOH | 102 | 82 |
| DASH | 120 | 10 |
| SYMBOL | 124-12F | 20 |
| NUMERIC | 130-139 | 04 |
| SYMBOL | 13C-13E | 20 |
| CAN'T READ | 13F | 40 |
| ALPHABETIC | 141-15A | 02 |
| SYMBOL | 156-15F | 20 |
| MICR HEAD | 160 | A0 |
| RA2 (MICR) | 162 | E0 |
| OMR HEAD | 168 | 90 |
| OCR 3 HEAD | 170 | 88 |
| RA2 (OCR 3) | 172 | C8 |
| OCR 4 HEAD | 178 | 84 |
| RA2 (OCR 4) | 17A | C4 |
| FIELD FORMAT ERROR | 17C | 01 |
| EOD | 17F | 81 |
| UNUSED LOCATION | | 00 |

HEAD 4 (OCR 4)

| SOH | 182 | 82 |
|---|---|---|
| DASH | 1A0 | 10 |
| SYMBOL | 1A4-1AF | 20 |
| NUMERIC | 1B0-1B9 | 04 |
| SYMBOL | 1BC-1BE | 20 |
| CAN'T READ | 1BF | 40 |
| ALPHABETIC | 1C1-1DA | 02 |
| SYMBOL | 1DC-1DF | 20 |
| MICR HEAD | 1E0 | A0 |
| RA2 (MICR) | 1E2 | E0 |
| OMR HEAD | 1E8 | 90 |
| OCR 3 HEAD | 1F0 | 88 |
| RA2 (OCR 3) | 1F2 | C8 |
| OCR 4 HEAD | 1F8 | 84 |
| RA2 (OCR 4) | 1FA | C4 |
| FIELD FORMAT ERROR | 1FC | 01 |
| EOD | 1FF | 81 |
| UNUSED LOCATION | | 00 |

QUEUE SYMBOL FIELD RECOVERY FLAGS FOR DEFINING BOUNDARIES OF ONE OR MORE FIELDS OF A DOCUMENT READ BY A READER SORTER

This application is a continuation, of application Ser. No. 098,274, filed 11/28/79, abandoned.

RELATED APPLICATION

The following U.S. patent application filed on an even date with the instant application and assigned to the same assignee as the instant application is related to the instant application.

1. "Apparatus for Translation of Character Codes for Application to a Data Processing System" by Arthur A. Parmet and Charles W. Dawson, and having U.S. Ser. No. 098,456, which issued as U.S. Pat. No. 4,425,626 on Jan. 10, 1984.

BACKGROUND OF THE INVENTION

1. Field of Use

This invention relates generally to the reading of documents by a reader/sorter for selecting a pocket into which the document is sorted; and more specifically, to the defining of OCR, MICR and OMR data fields within the document.

2. Description of the Prior Art

A reader/sorter has a number of heads for reading fields of information on documents such as checks having MICR and OCR fields. The information is read by the reader/sorter, processed by the controller, and transferred to a central processor unit which, under software control, selects a pocket for sorting the document. The information on the document is organized in fields. A field may include a control character followed by a group of data characters, followed by another control character. The prior art systems such as the Honeywell H200 Data Processing System having a reade/sorter on a subsystem transmit all of the characters read from the document through a controller to a central processor unit. Time-consuming software routines examined all of the characters received from the reader/sorter, differentiating control characters from data characters and defining the fields.

These systems are described in the Series 200 document entitled "Type 236 High Speed Document Reader-Sorter", the Series 200/2000 "234-0 MICR Reader-Sorter Operators Manual" and the Series 200/2000 "234-13/14 MICR Reader-Sorter Operation".

OBJECTS OF THE INVENTION

Accordingly, it is a primary object of the invention to provide a document sorting system with improved performance.

It is another object of the invention to provide a document sorting system with improved apparatus for defining the fields read from the document by the reader/sorter.

It is still another object of the invention to provide a document sorting system with improved apparatus for translating the queue symbols to the queue field identifier characters.

It is yet another object of the invention to provide a document sorting system with improved apparatus for identifying queue symbols and pseudo queue field identifiers for defining fields read from the document.

BRIEF DESCRIPTION OF THE DRAWINGS

The novel features which are characteristic of the invention are set forth with particularity in the appended claims. The invention itself, however, both as to organization and operation, may best be understood by reference to the following description in conjunction with the drawings in which:

FIG. 8 shows the contents of the programmable read only memory.

SUMMARY OF THE INVENTION

A document processing system includes a central processor unit (CPU), a main memory and a microprogrammed device controller (MDC), all coupled in common to a system bus. A reader/sorter is coupled to a reader/sorter adapter (RSA) which, in turn, is coupled to the MDC.

Character codes are generated in the reader/sorter and transferred to the RSA. The character codes include information read from the document as well as indicating the active read head and the position of the document relative to the read head. Included are start of document, end of document, read area 2 (RA2) character codes as well as character codes identifying the active head reading the document.

The character codes read from the document are data characters and special symbol characters, and are translated in the RSA to conform to the codes used in the CPU.

The information on the document is organized in fields. Certain character codes read from the document are translated in the RSA as queue field identifier (QFI) characters. The character codes read from the document are also translated into character identifier codes which indicate, typically, an alphabetic character, a numeric character, a dash or space, or a special symbol. The character codes generated by the reader/sorter are also translated into certain character identifier codes designating pseudo queue field identifier (PQFI) characters.

The QFI characters and PQFI characters identify the boundaries of the field.

The MDC includes a control store for storing firmware routines, an arithmetic logic unit (ALU) receiving the translated character codes and the character identifier codes for selecting the QFI characters from the translated character codes and the PQFI characters from the character identifier codes, and a scratch pad memory for storing in address locations the QFI or PQFI character codes starting and closing the fields.

In addition, the controller, under firmware control, generates a count of the number of positions the character received, following the QFI or PQFI starting character, is from the PQFI character identifying the active head.

The controller also generates a count of the number of positions the character received, immediately preceding the QFI or PQFI closing character, is from the PQFI character identifying the active head. These counts are stored in address locations in scratch pad memory.

In addition, the controller checks all translated character codes and character identifier codes for illegal character codes and stores, in address locations in scratch pad memory, a count of the number of illegal characters in the field with the location in the field of the illegal characters.

DESCRIPTION OF THE PREFERRED EMBODIMENT

Figure 1:
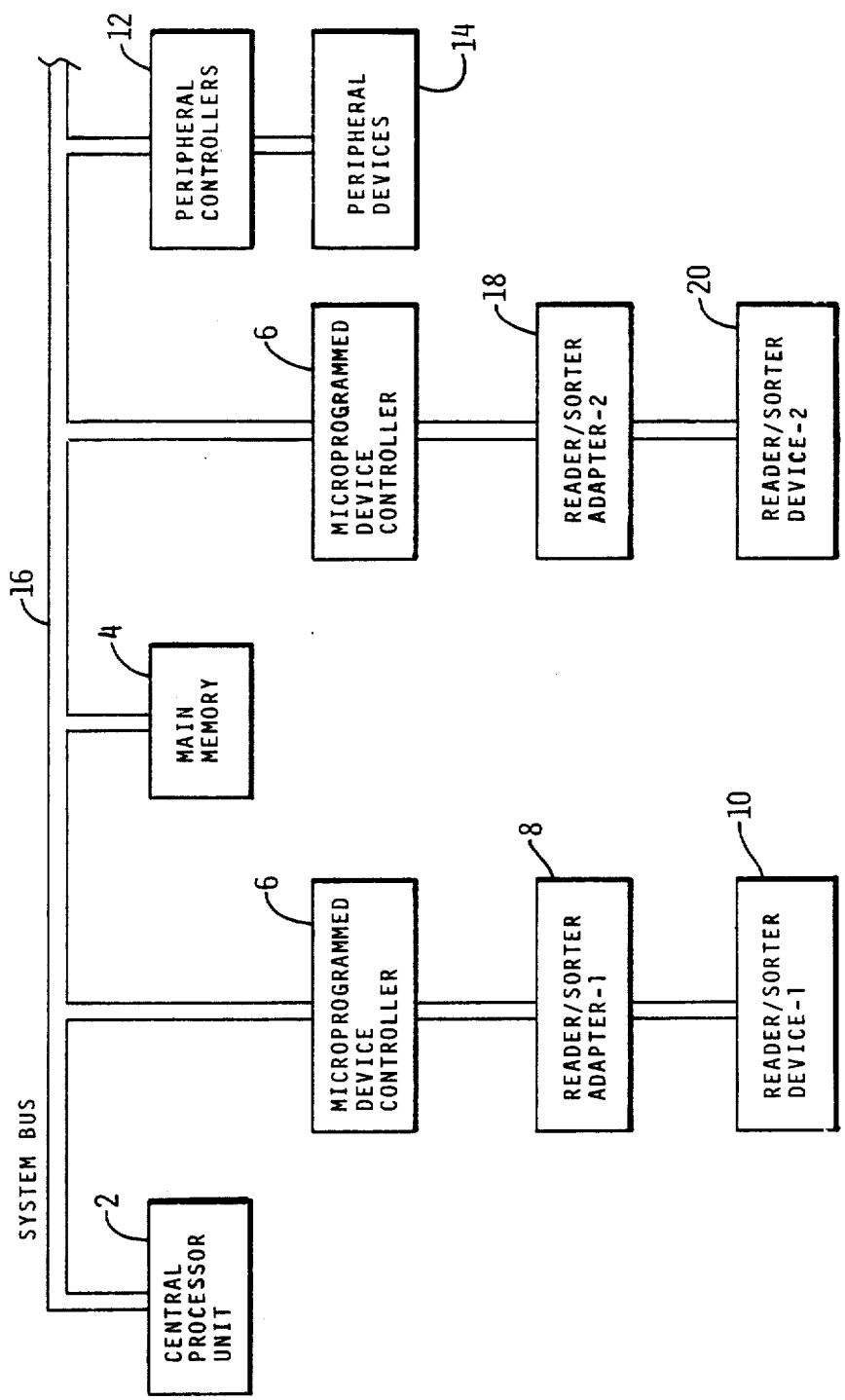
FIG. 1 is an overall block diagram of the system.

FIG. 1 shows the Document Processing System, which includes a central processor unit (CPU) 2, a main memory 4, a plurality of peripheral controllers 12, and a plurality of microprogrammed device controllers (MDC) 6, all coupled in common to a system bus 16.

Coupled to the MDC 6 may be a Reader/Sorter Adapter 1 (RSA1) 8 or a Reader/Sorter Adapter 2 (RSA2) 18. A Reader/Sorter Device 1 (RSD-1 ) 10, which may be a Honeywell Model DHU 9840 device, is coupled to the RSA1 8; and, a Reader/Sorter Device-2 (RSD-2) 20, which may be a Honeywell Model 234-0 or a 236, is coupled to the RSA2 18.

The MDC 6 is disclosed in U.S. Pat. No. 4,003,033 entitled, "Architecture for a Microprogrammed Device Controller" and by this reference is incorporated into and made part of this specification.

The Document Processing System reads documents in the Reader/Sorter Device-1 10 sequentially from up to four read heads. A first read head reads MICR (Magnatic Ink Character Recognition) characters, a second read head reads OMR words (Optical Mark Recognition) and the third and fourth read heads read OCR (Optical Character Recognition) characters. The information from the document is read through the RSA1 8 and MDC 6 onto the system bus 16 to main memory 4, and is processed by the CPU 2. Selected characters may be stored in main memory 4 for further processing.

The CPU 2 processes the information under program control and sends return signals via the system bus 16, the MDC 6, and the RSA1 8 to the Reader/Sorter Device-1 10, thereby indicating the pocket into which the document is sorted.

The MDC 6 is a microprogrammed peripheral controller which performs general purpose control functions such as executing system bus sequences, providing command storage, transferring and editing data, and establishing the general flow of command execution.

The RSA1 8 contains all the unique hardware necessary to dialogue with the Reader/Sorter Device-1 10.

This embodiment describes the relationship between the MDC 6 and the RSA1 8. It is understood that RSA2 18 and Reader/Sorter Device-2 20 operate with the MDC 6 in a similar manner as RSA1 8.

Figure 2:
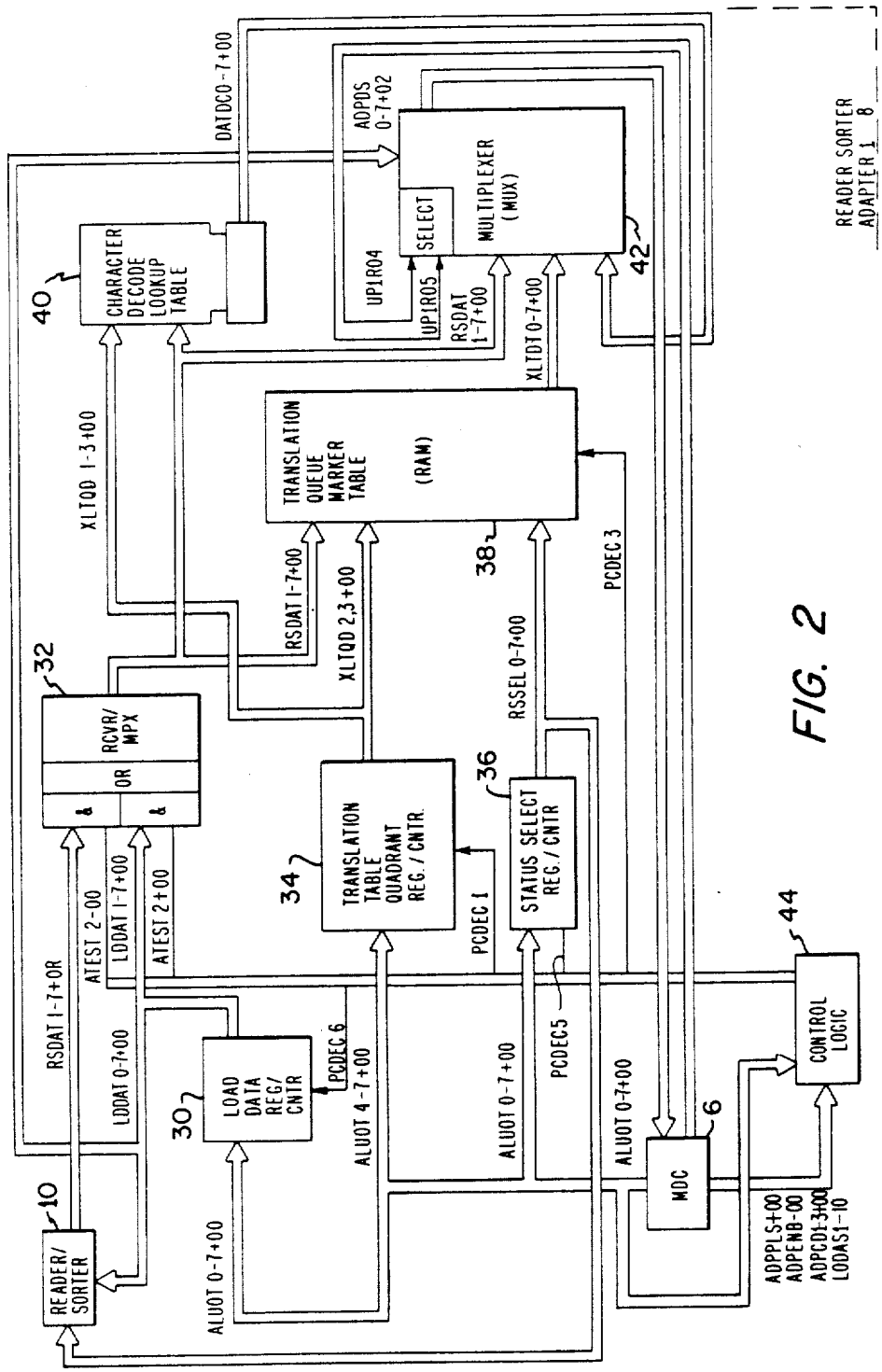
FIG. 2 is a block diagram of the reader/sorter adapter.

Referring to FIG. 2, the RSA1 8 includes a Translation and Queue Marker Table Random Access Memory (RAM) 38 for storing, in 512 addressable locations, character codes which are transferred to a multiplexer 42 as signals XLTDT0-7+00, and, in turn, to the MDC 6 as signals ADPDS0-7+02.

Document character code signals are applied to a receiver/multiplexer 32 of RSA1 8 as signals RSDAT1-7+OR (7 bits), and are applied to the address select terminals of RAM 38 to select the address locations storing the equivalent character code for transfer to MDC 6. A code identifying the particular head reading the document is stored in a Translation Table Quadrant Register/Counter 34. Signals XLTQD 2,3+00, applied to the address select terminals of RAM 38, select the 128 address locations in RAM 38 storing corresponding characters associated with a particular head.

| Head Number | Character Field | XLTQD 2 3 |
|---|---|---|
| 1 | MICR | 0 0 |
| 2 | OMR | 0 1 |
| 3 | OCR | 1 0 |
| 4 | OCR | 1 1 |

The RAM 38 is loaded initially with character codes that will be used by the CPU 2. These character codes include format characters, font select characters and data characters, and may be ASCII, EBCDIC, binary coded decimal, or any other appropriate code as required for the current sorting application.

A Load Data Register/Counter 30 applies output signals LDDAT0-7+00 to receiver/multiplexer 32. The Counter 30 is initially set to hexadecimal ZERO and incremented through 128 address locations under firmware control. Similarly, Counter 34 is reset to binary ZERO and incremented once every 128 character transfers for writing the 512 character codes into RAM 38.

The character code is applied to a Status Select Register/Counter 36 from the MDC 6 via signals ALUOT 0-7+00 and applied to RAM 38 as signals RSSEL0-7+00.

RAM 38, therefore, is loaded initially with the character codes requirer by the CPU 2.

During the reading of the document, the characters are translated into the required code by RAM 38. Signals LDDAT 0-7+00 are applied to the Reader/Sorter Dince-1 10 and indicate the pocket into which the document is to be sorted.

The Reader/Sorter Adapter-1 8 is controlled by logic signals ADPPLS+00, ADPENB-00, ADPCD1-3+00, and LODAS1-10, which are applied to control logic 44 from MDC 6. Output signals PCDEC 1,3,5 and 6 initiate the required cycles of loading, clearing, writing and incrementing as shown in the timing diagram of FIG. 4.

Character code signals RSDAT 1-7+00 and translation table quadrant signals XLTQD 1-3+00 are applied to the address selection terminals of a character decode lookup table 40. Output signals DATDC0-7+00 are coded to indicate the type of character received by RSA1 8; that is, if it is a numeric, an alphabetic, a control, or a formatting character.

Signals UP1R04 and UP1R05 are generated by MDC 6 and applied to the select terminals of MUX 42 to transfer the selected MUX 42 output signals to MDC 6. Signals ATEST2+00 and ATEST2-00, applied to RCVR/MPX 32, are generated by control logic 44 to select either the load operation or the translate ooeration.

Figure 3:
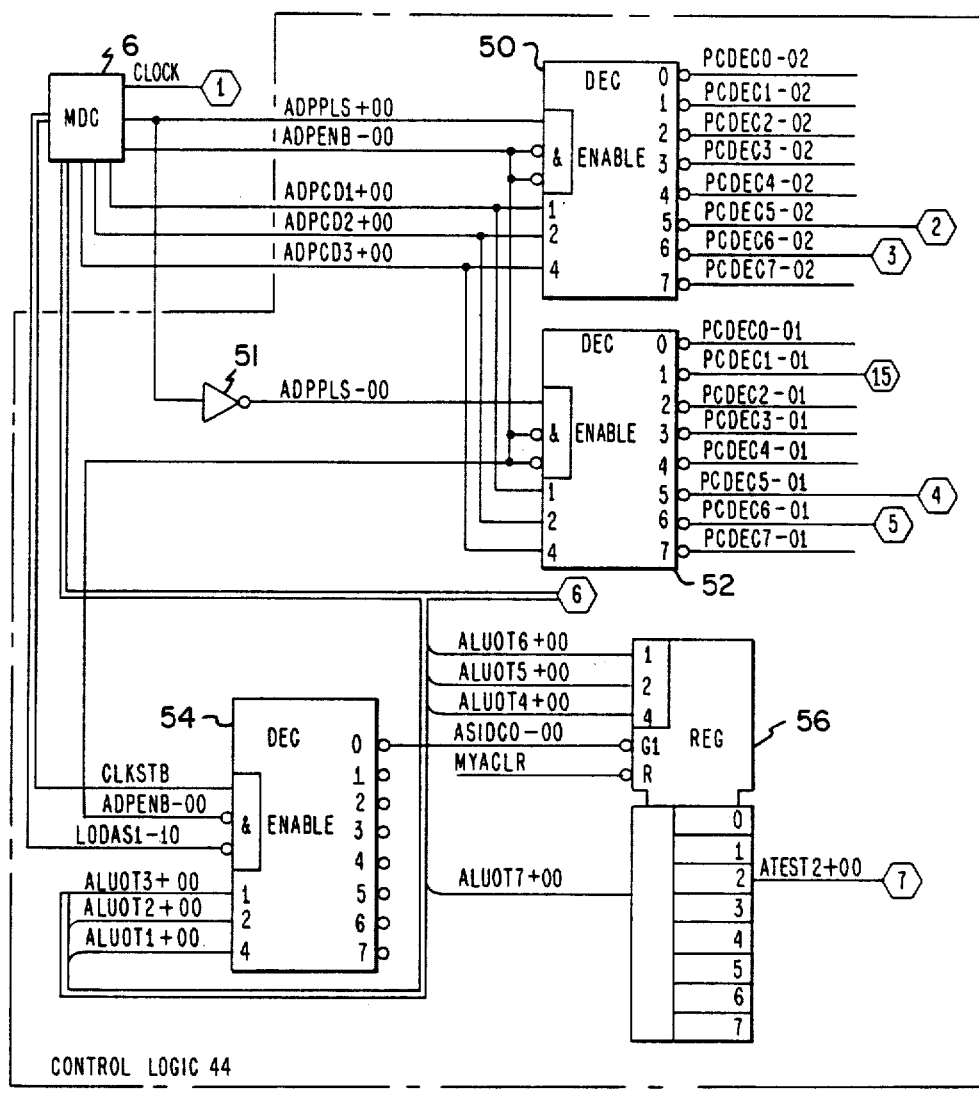
FIG. 3 is a detailed logic diagram of the reader/sorter adapter.
Figure 3:
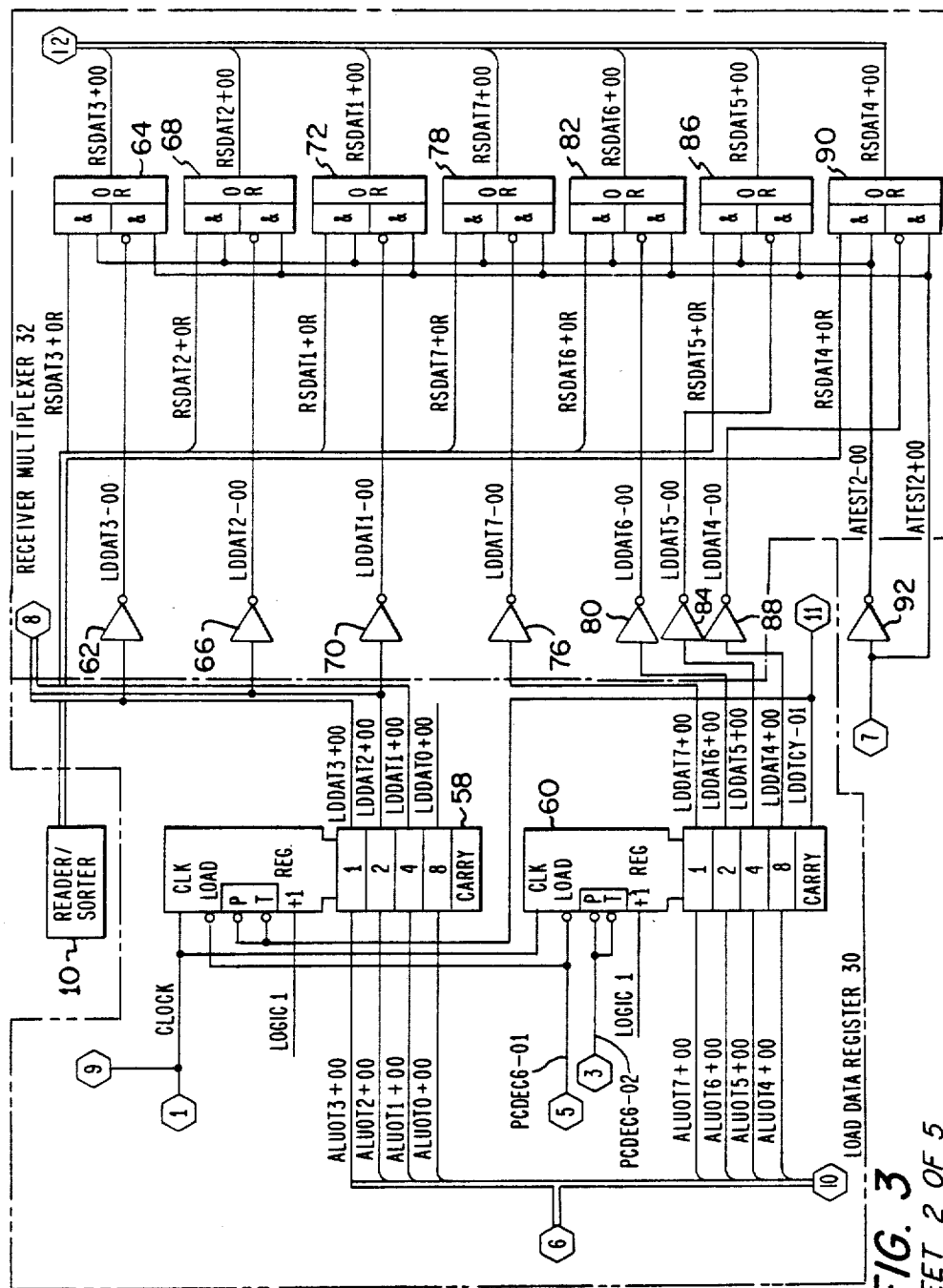
Figure 3:
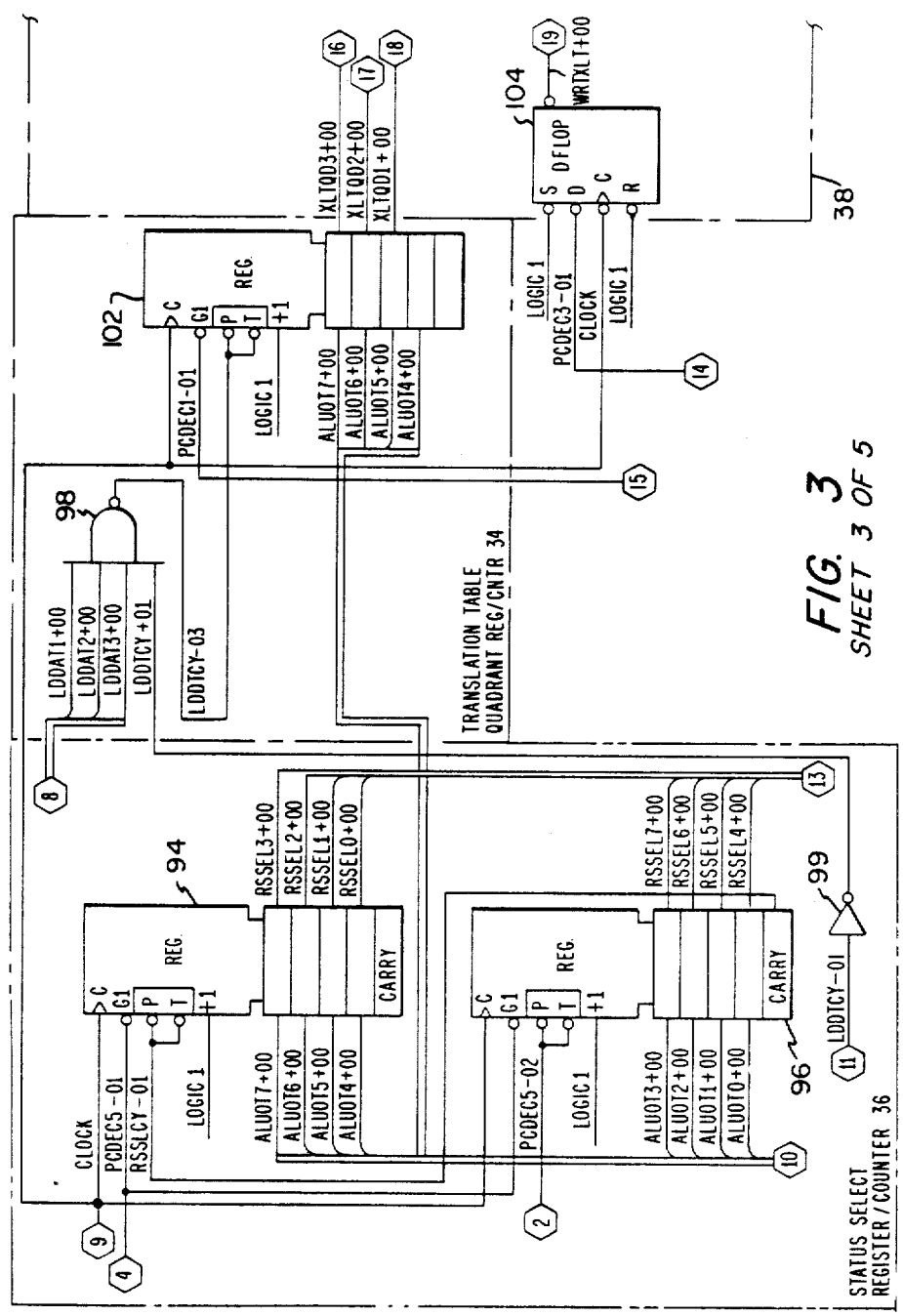
Figure 3:
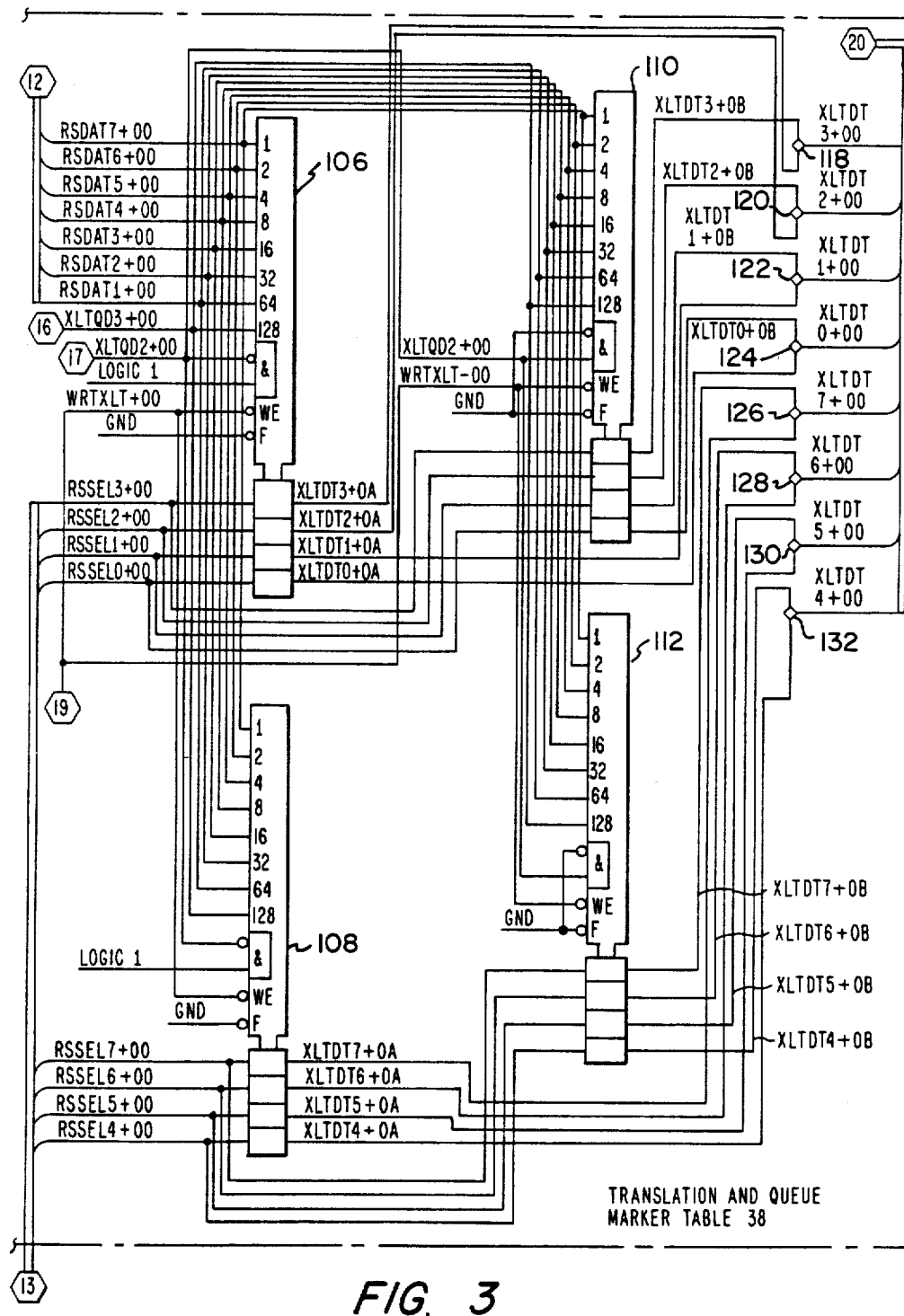
Figure 3:
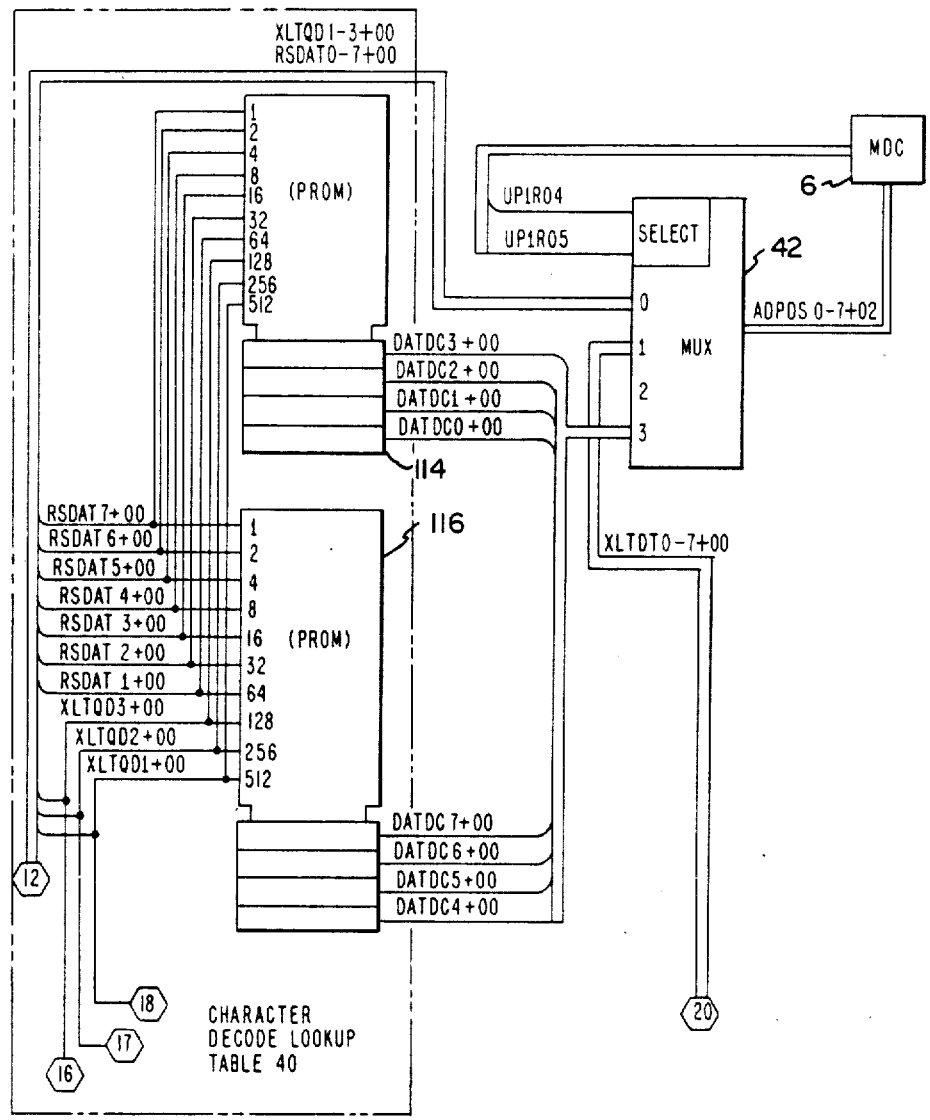

Referring to FIG. 3, the Translation and Queue Marker Table, RAM 38 includes random access memories (RAMs) 106, 108, 110 and 112 (Sheet 4), which are 2101A memory circuits described in the Intel Data Catalog 1978, pages 3-26. The catalog is published by Intel Corporation, 3015 Bowers Avenue, Santa Clara, California 95051.

During the document reading operation, character code signals are received from Reader/Sorter 10 over signal lines RSDAT1-7+OR, and are applied to receiver/multiplexer 32, which includes receiver/multiplexers 64, 68, 72, 78, 82, 86 and 90 (Sheet 2). Control signal ATEST2-00 is at logical ONE for the document reading operation. Character code output signals RSDAT1-7+00 are applied to the address select inputs of RAMs 106, 108, 110 and 112 (Sheet 4). Counter 102 (Sheet 3) of Translation Table Quadrant Register/Counter 34 provides signal XLTQD2+00, which enables RAMs 106 and 108 or RAMs 110 or 112 (Sheet 4). XLTQD3+00 is applied to the address select terminal 128. Address locations 000 through $127_{10}$ of RAMs 106 and 108 store characters decoding the characters on the document read by head 1. Address locations $128_{10}$ through $255_{10}$ of RAMs 106 and 108 store characters decoding the characters on the document read by head 2. Similarly, address locations 000 through $127_{10}$ of RAMs 110 and 112 are associated with head 3, and address locations $128_{10}$ through $255_{10}$ with head 4.

The output of RAMs 106 and 108, signals XLTDT0-7+0A, and RAMs 110 and 112, signals XLTDT0-7+OB, are applied to wired OR circuits 118 through 132. The output signals XLTDT0-7+00 are applied to input terminal 1 of MUX 42 (Sheet 5).

Initially the RAMs 106, 108, 110 and 112 are loaded with character codes compatible with the data processing system of the Document Processing System, namely, the CPU 2, main memory 4, and MDC 6. The character codes include data characters as well as control characters.

The load operation is initiated by MDC 6 sending hexadecimal 05 over signal lines ALUOT1-7+00 with control signals ADPENB-00 and LODAS1-10 at logical ZERO to control logic 44 which includes a decoder 54 (Sheet 1). This enables decoder 54 and output signal ASIDCO-00, forced to logical ZERO at the rise of clock strobe signal CLKSTB, enables the loading of a register 56. Since signals ALUOT5+00 and ALUOT7+00 are at logical ONE, output signal ATEST2+00 is at logical ONE. Signal ATEST2-00, the output of an inverter 92 (Sheet 2), is at logical ZERO. This selects the load signals LDDAT1-7-00, the outputs of inverters 62, 66, 70, 76, 80, 84 and 88 (Sheet 2), through receiver/multiplexers 64, 68, 72, 78, 82, 86 and 90, as output signals RSDAT1-7+00. This is shown in clock cycle A of the timing chart of FIG. 4. On the next clock cycle (cycle B, FIG. 4), hexadecimal 00 is sent over signal lines ALUOT0-7+00 along with signals ADPENB-00 and ADPPLS+00 at logical ZERO, thereby enabling a decoder 52 (Sheet 1). Signal ADPPLS-00 is at logical ONE as the output of an inverter 51 (Sheet 1). Output signal PCDEC6-01 at logical ZERO is applied to the LOAD terminals of load data registers 58 and 60 (Sheet 2). ADPCD1+00 is at logical ZERO and signals ADPCD2+00 and ADPCD3+00 are at logical ONE. Hexadecimal 00 is set into registers 58 and 60 since signals ALUOT0-7+00 are at logical ZERO.

Figure 4:
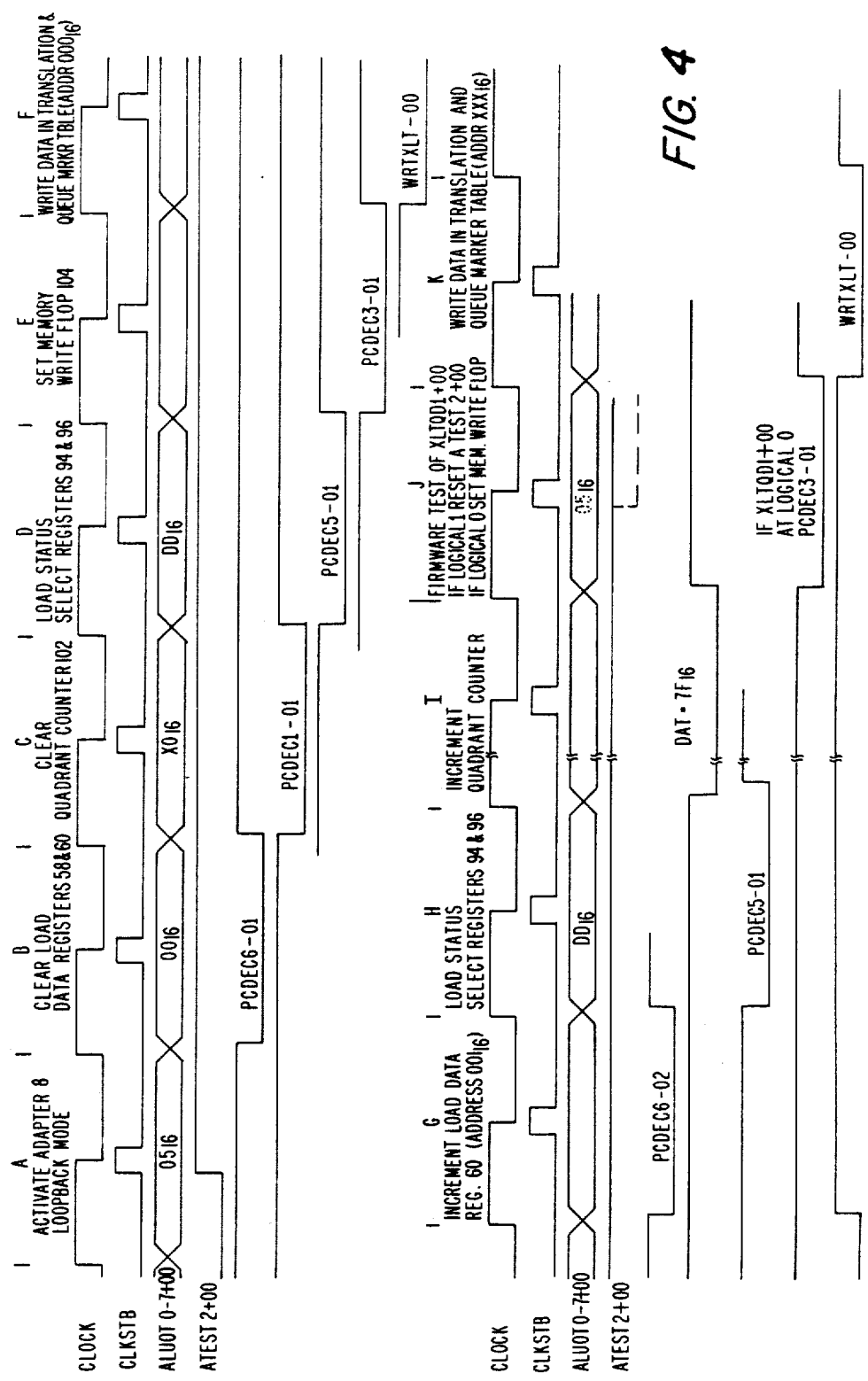
FIG. 4 is a timing diagram showing load data operation.

Signals ALUOT4-7+00 are at logical ZERO during clock cycle C, FIG. 4, and signals from MDC 6 force the PCDEC1-01 output signal of decoder 52, FIG. 3 (Sheet 1), to logical ZERO. This forces counter 102 (Sheet 3) to hexadecimal ZERO for decoding the address locations of RAMs 106 and 108 (Sheet 4) with translated character codes read by head 1 of Reader/Sorter 10.

During cycle D, FIG. 4, control signal PCDEC5-01, the output of decoder 52 (FIG. 3 Sheet 1), is forced to logical ZERO enabling counters 94 and 96 (Sheet 3) to store the first translated character code received over signal bus ALUOT0-7+00 from MDC 6.

On the next clock cycle (cycle E, FIG. 4), a D flop 104, FIG. 3 (Sheet 3) is set on the rise of the CLOCK signal when signal PCDEC3-01 is at logical ZERO, thereby forcing the write pulse signal WRTXLT-00 to logical ZERO.

On the next clock cycle (cycle F, FIG. 4), the data stored in the status select registers 94 and 96, FIG. 3 (Sheet 3), are written into address location 000 of RAMs 106 and 108 via signal lines RSSEL0-7+00.

On the next cycle (cycle G, FIG. 4), control signal ADPPLS+00 is at logical ONE, thereby enabling a decoder 50, FIG. 3 (Sheet 1), and signal PCDEC6-02 is forced to logical ZERO, thereby incrementing load data register 60 to 001; and, on the next cycle (cycle H, FIG. 4), the next data character is loaded into registers 94 and 96 (Sheet 3), and cycle D, E, F and G are repeated until the registers 58 and 60 (Sheet 2) store hexadecimal 7F. That is, signals LDDAT1-7-00 are at logical ONE, indicating address location $127_{10}$. On the next increment load data register clock cycle (cycle G, FIG. 4), the carry signal LDDTCY-01 of register 60 is forced to logical ZERO, which increments load data register 58 on the next rise of the CLOCK signal. This forces the LDDAT0+00 signal to logical ONE, and signals LDDAT1-7+00 to logical ZERO.

Also, the carry signal LDDTCY+01, output of an inverter 99 (Sheet 3), is applied to a NAND gate 98. Since signals LDDAT1-3+00 are also at logical ONE during this cycle, the output signal LDDTCY-03 at logical ZERO is applied to the PT terminals of counter 102. This increments counter 102, and output signal XLTQD3+00 is forced to logical ONE. This enables the selection of address locations $128_{10}$ through $255_{10}$ of RAMs 106 and 108 (Sheet 4). This is shown in cycle I, FIG. 4.

Signals LDDAT0+00 at logical ONE and LDDAT1+00 at logical ZERO indicate to MDC 6 that the head 1 character sequence is completed and registers 58 and 60 (Sheet 2) store address location 000. When the head 2 character sequence is completed, counter 102 (Sheet 3) is incremanted as described supra through NAND gate 98, forcing signal XLTQD2+00 to logical ONE and XLTQD3+00 to logical ZERO. On the next clock cycle, signals LDDAT0+00 and LDDAT1+00 are at loqical ZERO, indicating to the MDC 6 that the head 2 character sequence is completed.

Signal XLTQD2+00 at logical ONE selects RAMs 11 and 112 (Sheet 4), the above sequence is repeated for the heads 3 and 4 character sequences. This time, when counter 102 (Sheet 3) is incremented, signal XLTQD1+00 is forced to logical ONE. This indicates to MDC 6 that the load operation is completed and, as shown in cycle J, FIG. 4, signal ATEST2 is forced to logical ZERO in register 56 FIG. 3 (Sheet 1). If signal XLTOD1+00 is at logical ZERO, then in cycle J, FIG. 4, signal PCDEC3-01 is forced to logical ZERO by MDC 6 and the memory write flop 104 FIG. 3 (Sheet 3), is set and cycle K is a write data cycle as in cycle E.

PROMs 114 and 116, FIG. 3 (Sheet 5), of character decode lookup table 40, receive character code signals RSDAT1-7+00 and translation table quadrant signals XLTQD1-3+00, and provide output signals DATDC0-7+00, as described supra.

Figure 5:
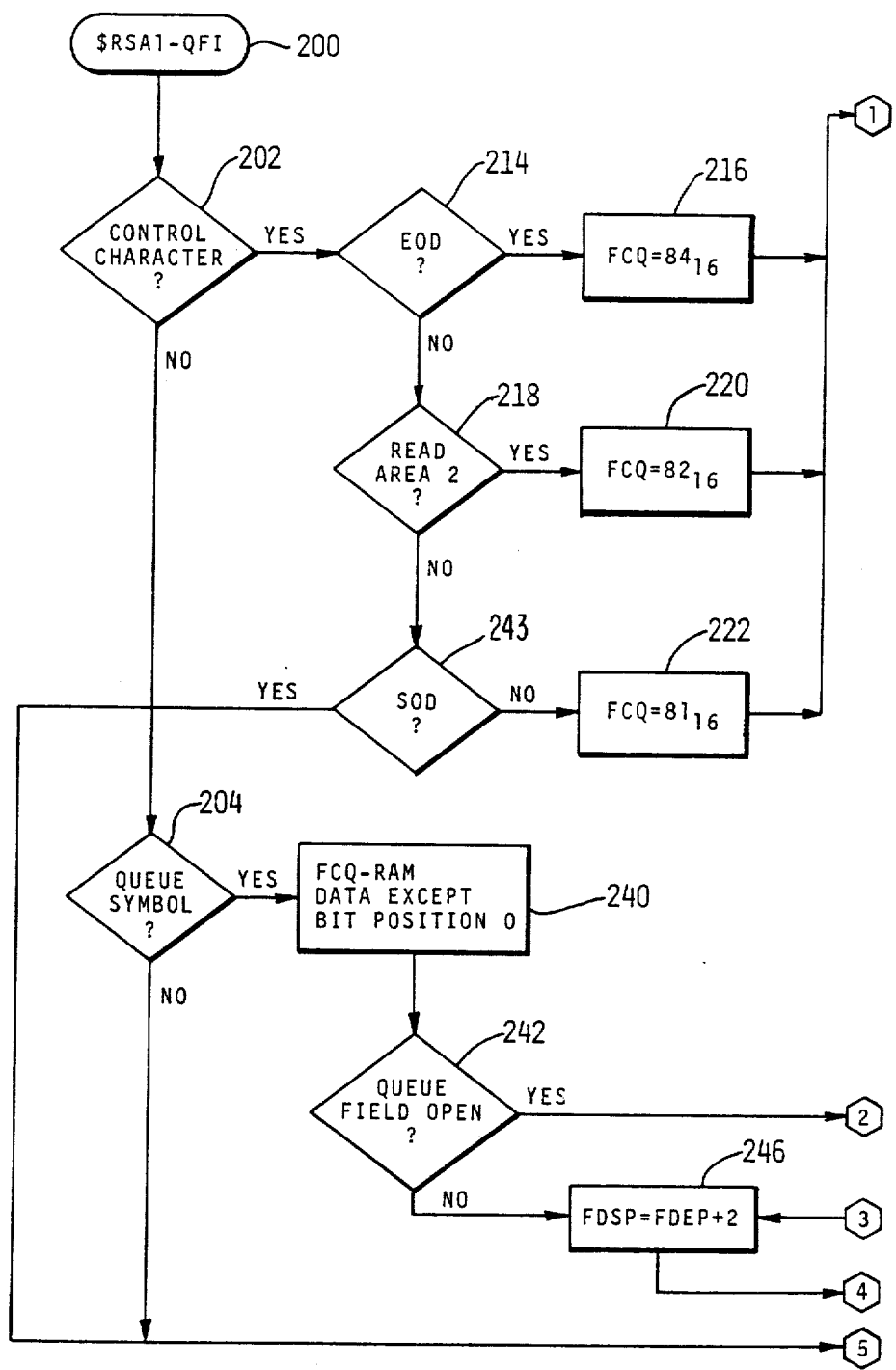
FIG. 5 is a flow diagram of the firmware sequences in the microprogrammed device controller which identifies the fields.
Figure 5:
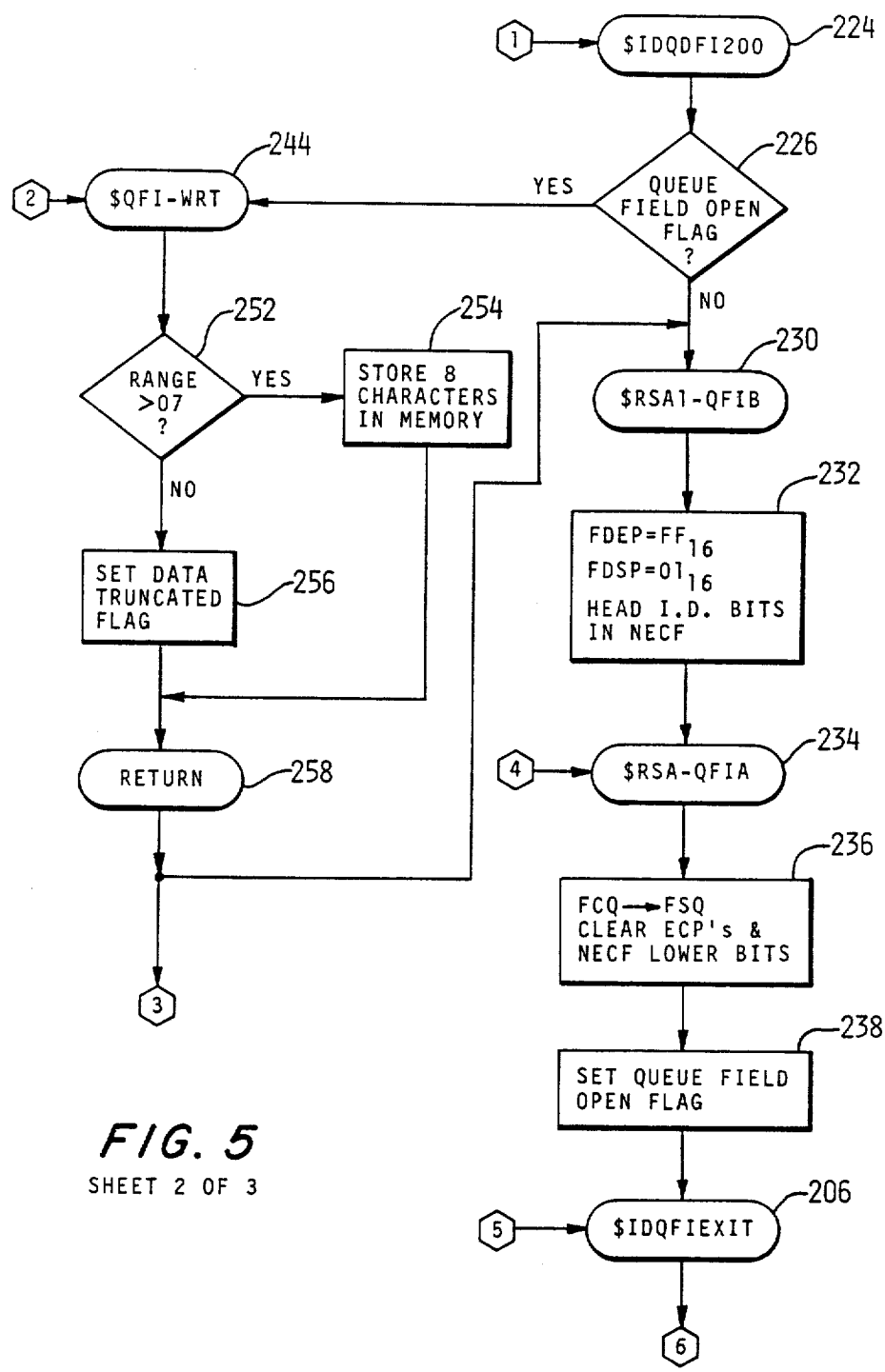
Figure 5:
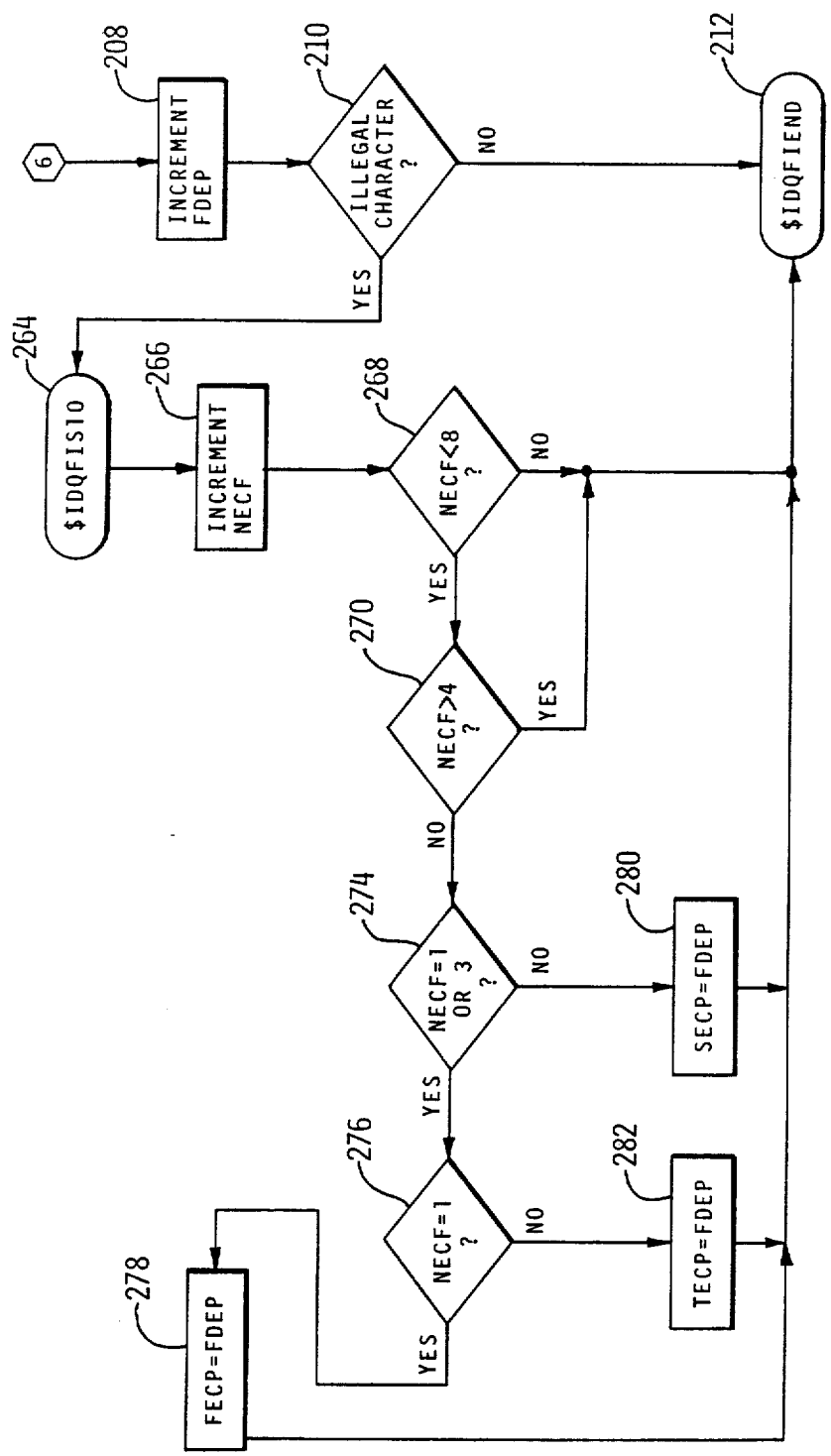

FIG. 5 is a flow chart of the firmware routines in the MDC 6 that processes character codes received from the RSA1 8. A firmware routine RSA1-QF1 200 analyzes the character code for a control character, a queue field identifier character or a data character. Firmware routine 200 identifies the start of document and the end of document characters as well as the queue symbols, thereby defining the data field. The start and end of field characters may be control characters or queue symbols. Queue symbols are translated into queue field identifier characters as the output of RAMs 106, 108, 110 and 112 of FIG. 3.

The firmware initially selects the outputs of MUXs 114 and 116, signals DATDC0-7+00, which are applied to the input terminal 3 of MUX 42. The outputs of MUX 42, signals ADPDS0-7+02, are applied to MDC 6. Decision block 202 examines signal ADPDS0+02 which, if at logical ONE, indicates a control character. The firmware then tests signals ADPDS1-7+02 in decision block 214 for the end of document character (EOD). If the control character is an EOD character, then in block 216 a hexadecimal 84 is stored in the field closing queue (FCQ) character address location in scratch pad memory 300, FIG. 6.

Decision block 218 tests signals ADPDS1-7+02 for a read area 2 (RA2) control character. If the RA2 control character is sensed, then in block 220 a hexadecimal 82 is stored in the FCQ address location. RA2 is called a pseudo queue field identifier which indicates that an area in the document was purposely skipped and the read head reactivated.

Decision block 243 tests signals ADPDS1-7+02 for the start of document (SOD) control character. If this control character is not an SOD character, then it is a read head identification (HID) character and in block 222, a hexadecimal 81 is stored in the FCQ address location. If decision block 243 senses the SOD character, then firmware routine $IDOFIEXIT 206 is called.

If decision block 202 indicates that the character received is not a control character, that is, signal ADPDS0+02 is at logical ZERO, then the firmware selects the outputs of RAMs 106, 108, 110 and 112 which are applied to input terminal 1 of MUX 42 as signals XLTDT0-7+00.

Figure 6:
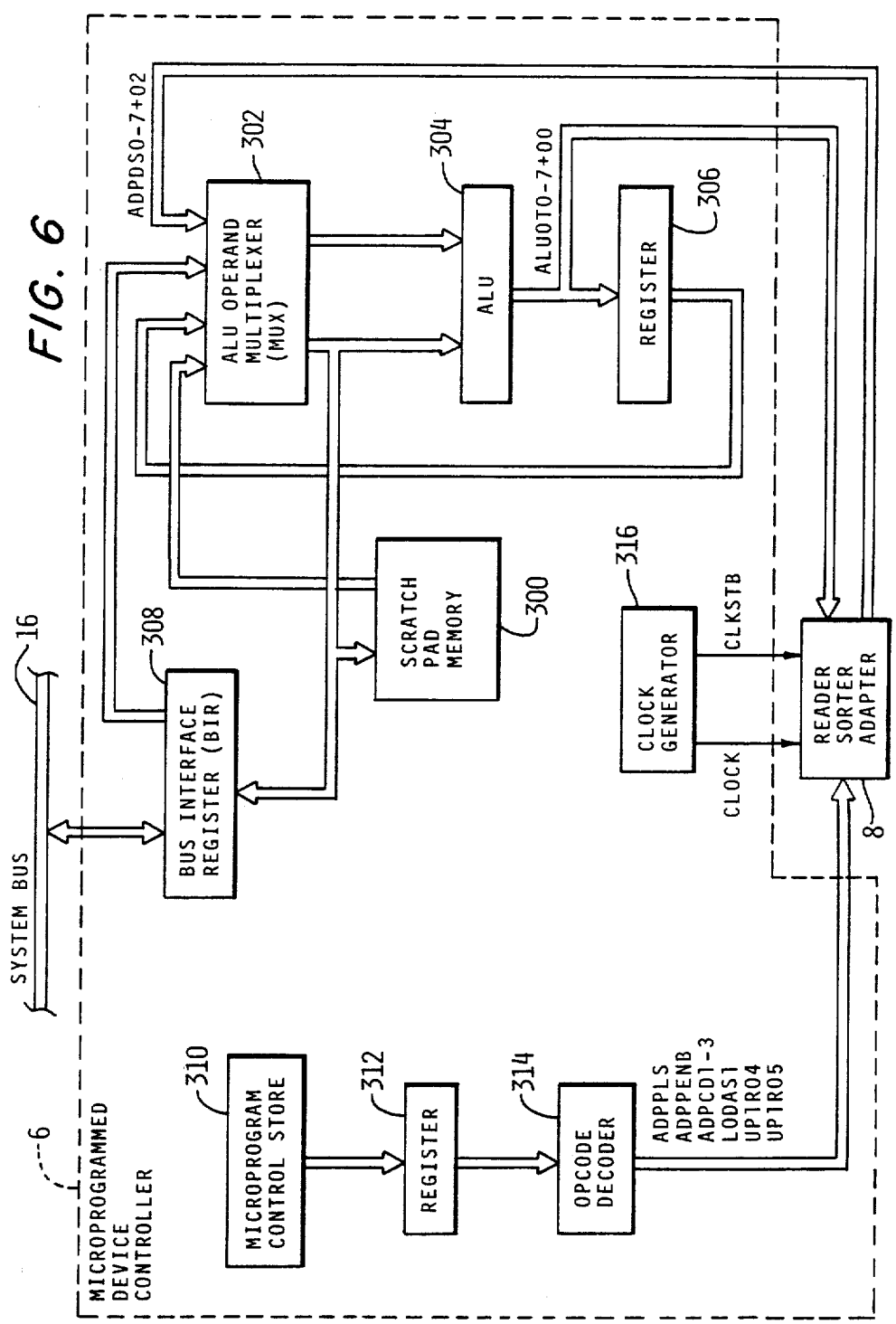
FIG. 6 is a block diagram of the microprogrammed device controller.

Decision block 204 tests signal ADPDS0+02, but this time the signal at logical ONE indicates a queue symbol, and at logical ZERO indicates that an information character was read. If an information character was read, then firmware routine $IDQFIEXIT 206 is called. The field data end position (FDEP) count stored in scratch pad memory 300, FIG. 6, is incremented in block 208. The FDEP stores a count of the number of character positions—the last character in the field is from the head character.

Decision block 210 checks if the character received is an illegal character. If it is not an illegal character, then the firmware subroutine $IDQFIEND 212 starts a sequence which results in the character being loaded into main memory 4 and RSA1 8 is ready to send the next character to MDC 6.

After the control character is identified and the appropriate code written in the FCQ address location, a firmware routine, $IDQFI200 224, is called which, in decision block 226, tests if a control character or a queue field identifier character was received previously during the reading of the document. If not, then firmware routine $RSA1-QFIB 230 is called to initialize the basic fields.

Block 232 initializes a number of address locations in scratch pad memory. The FDEP address location is initialized to hexadecimal FF and the field data start position (FDSP) address location is initialized to hexadecimal 01. Also the read head that is operative is identified in the number of error characters in field (NECF) address location.

Firmware subroutine $RSA1-QFIA 234 in block 236 stores the contents of the FCQ address location hexadecimal 81, if the first character is the HID character, into the field opening queue (FOQ) address location and clears the FCQ address location to hexadecimal 00. Also cleared are the first, second and third error character positions (ECPs) address locations and the lower bit positions of the NECF address locations.

Block 238 sets an indication that the first control character of the document was received and the queue field is open.

Routine $IDQFIEXIT 206 now increments the FDEP address location to hexadecimal 00 in block 208.

Decision block 204 recognizes that a queue field identifier code from RAMs 106, 108, 110 and 112, FIG. 3, was received, and in block 240 the character code is stored in the FCQ address location with the bit position 0 set at binary ZERO. Decision block 242 tests the queue field and if it is open calls for routine $QFI-WRT 244. $QFI-WRT 244 is the subroutine which stores a completely assembled queue field identifier block of address locations FOQ, FCQ, FDSP and FDEP of scratch pad memory 300 into memory 4.

Decision block 252 tests if eight characters are stored in the above address locations. If there are 8 characters stored, then in block 254 the 8 characters are transferred to memory 4, and in block 258 the firmware returns to block 246.

If the result of decision block 252 tests negative, then in block 256 a data truncated flag is set to indicate that a QFI field was not forwarded to main memory 4. In block 258, the firmware returns to block 246. Here, the contents of FDEP has hexadecimal 2 added to it and the answer stored in the field data start position (FDSP) address location of scratch pad memory 300. This defines the position of the first data character in the next QFI field of the document.

Firmware routine $RA1-QFIA 234 is called, and in block 236 the contents of address location FCQ is stored in address location FSQ and in block 208 the contents of address location FDEP is incremented. Decision block 210 again checks for an illegal character. The legal queue field identifier character is stored in main memory 4 in the firmware sequence started by routine $IDQFIEND 212. Subsequent data characters are read, incrementing address location FDEP in block 208 as described supra so that address location FDEP stores a count of the position—the current character in the data field is from the head identifier character.

If decision block 202 senses a control character such as an end of document (EOD) character code, hexadecimal 84 is loaded into address location FCQ in block 216, and firmware routine $IDQFI200 224 is called. Decision block 226 calls firmware routine $QFI-WRT 244.

Previously, decision block 242 called firmware routine $QFI-WRT 244 which transferred the contents of address locations FCQ, FSQ, FDEP, FDSP and the error count and error character positions to main memory 4, and returned to block 246. Here the EOD character initiates the calling of firmware routine $QFI-WRT 244 which transfers the contents of the above address locations FCQ, FSQ, FDEP, FDSP and the error count and error character positions to main memory 4. The routine 244 returns to call firmware routine $RSA1-QFIB 230.

Detection of EOD from the device indicates no further data character from the document is to be transferred, thus implying no further building of QFIs.

If decision block 210 indicates an illegal character, then firmware subroutine $IDQFI510 264 is called. In block 266 the number of error characters in field (NECF) is incremented. In decision block 268 the NECF is tested for greater than 8 errors. If there are more than 8 errors in the field, the routine is terminated and firmware routine $IDQFIEND 212 is called. If decision block 268 shows less than 8 errors, then decision block 270 tests for less than 4 errors. If NECF indicates less than 4 errors, then decision block 274 tests for 1 or 3 errors, and decision block 276 tests for 1 error. Block 278 stores an indication of the first error character position (FECP), block 280 stores an indication of the second error character position and block 282 stores an indication of the third error character position, and the end firmware routine $IDQFIEND 212 is called.

FIG. 6 is a block diagram of the microprogrammed device controller 6.

Character signals ADPDS0-7+02 are received from the RSA1 8 throuqh an arithmetic logic unit (ALU) 304 and multiplexer (MUX) 302 and stored in a scratch pad memory 300. Information from scratch pad memory 300 is transferred to a register 306 via MUX 302 and an ALU 304. The information stored in register 306 is transferred out on system bus 16 via MUX 302 and a bus interface register (BIR) 308.

Signals ALUOT0-7+00 are sent to the RSA1 8 from the system bus 16 via BIR 308, MUX 302 and ALU 304.

The control signals ADPPLS, ADPPENB, ADPCD1-3, LODAS1, UP1R04 and UP1R05 are generated from microwords read from a microprogram control store 310, stored via register 312 and decoded by an opcode decoder 314. Clock generator 316 develops the CLOCK and CLKSTB signals which are applied to RSA1 8.

Figure 7:
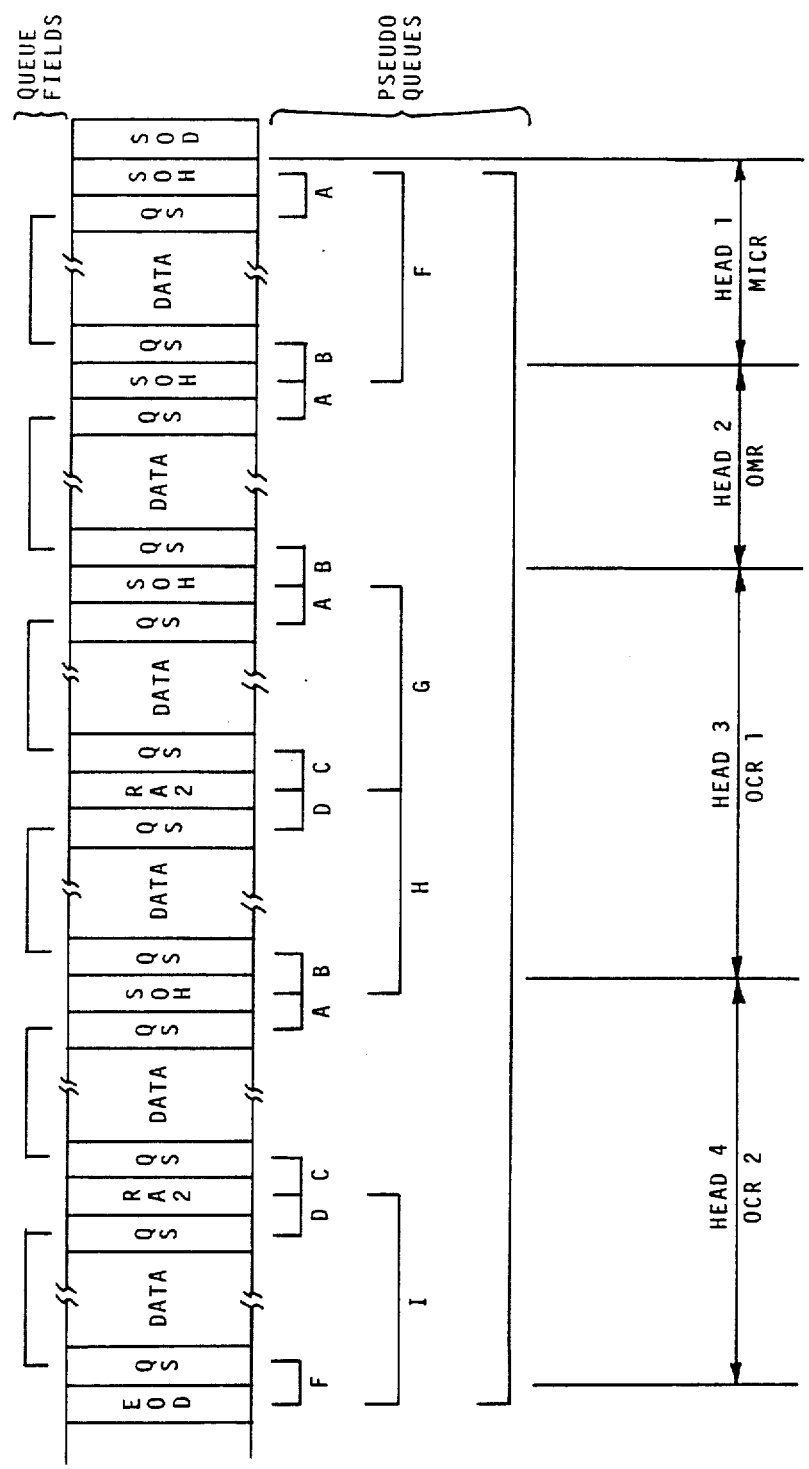
FIG. 7 shows the character sequence received by the reader/sorter adapter.

FIG. 7 shows a typical stream of characters from a document having an MICR field, an OMR field, an OCR1 field and an OCR2 field. The start of document (SOD), start of head (SOH), read area 2 (RA2), and end of document (EOD) characters are the pseudo queue field characters. Queue symbol (QS) characters are translated to queue field identifier (QFI) characters in the translation and queue marker Table 38, FIG. 2.

The notation SOH-QS indicates that the start of head is stored in address location FOQ and the queue symbol is stored in address location FCQ of scratch pad memory 300.

A. SOH-QS indicates the start of the first read area of this head.

B. QS-SOH indicates the end of a read area of this head.

C. QS-RA2 indicates the end of the first read area of this head.

D. RA2-QS indicates the start of read area 2.

E. QS-EOD indicates the last read area of the document.

F. SOH-SOH indicates that no QS characters and data were detected for this head.

G. SOH-RA2 indicates that no data and no OS characters were detected in the first read area of this head.

H. RA2-SOH indicates that no data and no QS characters were detected in the second read area of this head.

I. RA2-EOD indicates that no data and no QS characters were detected in the last read area of the document.

J. SOH-EOD indicates that either no QS characters were detected in the document or in the last read head or read heads.

The contents of address locations FOQ and FCQ, when examined by the CPU 2, will indicate the status of the reading of the document by reader/sorter 10.

FIG. 8 shows the contents of PROMs 114 and 116. The address locations are shown in hexadecimal form. Signals XLTQD1-3+00 and RSDAT1-7+00, applied to the address terminals, select the 10 low order bits of the 12 bit hexadecimal address location shown in FIG. 8. The 11th and 12th bit positions are at binary ZERO. The 9th and 10th bit positions indicate the operative read head and are a representation of the state of signals XLTQD1+00 and XLTQD2+00.

The contents of the selected address location appear on the 8 signal lines DATDC0-7+00, and are shown in FIG. 8 in hexadecimal form.

The following chart shows the interpretation of the bits of the contents of selected address locations:

|  | Signal | Weight | Bit 0=0 | Bit 0=1 |
|---|---|---|---|---|
| MSB | DATDC0+00 | 8 | 0 | 1 |
|  | DATDC1+00 | 4 | Can't Read | Read Area 2 |
|  | DATDC2+00 | 2 | Symbol | Head 1ID (MICR) |
|  | DATDC3+00 | 1 | Dash or Space | Head 2ID (OMR) |
|  | DATDC4+00 | 8 | Transit Symbol | Head 3ID (OCR1) |
|  | DATDC5+00 | 4 | Numeric | Head 4ID (OCR2) |
|  | DADTC6+00 | 2 | Alpha | SOD |
| LSB | DATDC7+00 | 1 | Field Format Error | EOD |

As an example, the content of address location hexadecimal 17A is hexadecimal C4. Hexadecimal 17A, expressed as a binary number, is 0001 0111 1010. The 11th and 12th bit positions contain binary 00 and are ignored. The 10th and 9th bit positions contain binary 01 respectively indicating that the character was read by read head 3. Hexadecimal C4 expressed as a binary number, binary 1100 0100, indicates a read area 2 character associated with head 4. This is an indication to the MDC 6 that head 3 has completed the reading of the OCR1 field, and the document will pass to the read head 4 read station for reading the OCR2 field.

Following is a table identifying the logical elements of this embodiment:

| The TTL Data Book for Design Engineers, Second Edition, published by Texas Instruments | |
|---|---|
| Decoders 50, 52, 54 | 74LS138 |
| Counter/Registers; 58, 60, 94 96, 102 | 74LS169 |
| D Flop 104 | 74LS74 |
| MUX 42 | 74LS253 |
| Signetics Bipolar & MOS Memory Data Manual 1977 Edition, page 126 | |
| PROM 114, 116 | 82S137 |
| Signetics Logic - TTL Data Manual copyright | |

-continued

| 1978, page 625 | |
|---|---|
| Register 56 | 9334 |

Having shown and described a preferred embodiment of the invention, those skilled in the art will realize that many variations and modifications may be made to affect the described invention and still be within the scope of the claimed invention. Thus, many of the elements will provide the same results and fall within the spirit of the claimed invention. It is the intention, therefore, to limit the invention only as indicated by the scope of the claims.

What is claimed is:

1. A document processing system for processing information on documents read by a reader sorter includes a central processing unit, a main memory and a controller, all coupled in common to a system bus, said document processing system further including an adapter coupled to said reader sorter and said controller for processing said information, said document processing system comprising:

said adapter including, receiving means coupled to said reader sorter for receiving character signals representative of said information;

random access memory means coupled to said receiving means and responsive to said character signals for selecting translated character signals, and said translated character signals having a selected one of said said translated character signals in a first state being representative of said character, and a control character, and having said selected one of said translated character signals in a second state being representative of said character being a queue filed identifier character for designating the boundary of a field;

read only memory means coupled to said receiving means and responsive to said character signals for selecting a character identifier having a selected one of said character signals in a first state identifying said character, and having said selected one of said character signals in a second state identifying said control character as a pseudo queue field identifier character for designating the boundary of a field for transfer to main memory; and multiplexer means coupled to said random access memory and said read only memory means, and responsive to controller signals in a first state for selecting said translated character signals, and responsive to said controller signals in a second state for selecting said character identifier signals for transfer to said controller, wherein said controller is responsive to said translated character signals representative of said queue field identifier character and said character identifier signals representative of said pseudo queue field identifier character;

said controller being further responsive to said translated character signals for generating a start position character count and an end position character count in a field for transfer to said main memory, said controller including, control means coupled to said adapter for generating said controller signals in said first state for selecting said translated character signals, and said controller signals in said second state for selecting said character identifier signals;

arithmetic logic unit means coupled to said adapter, and responsive to said translated character signals, having said selected one of said translated character signals in said second state, for generating said queue field identifier character, and responsive to said character identification signals, having state, for generating said pseudo queue field identifier character; and scratch pad memory means coupled to said arithmetic logic unit means including first means for storing first signals representative of said queue field identifier character in a first address location representative of a field opening queue character, second means for storing said first signals in a second address location representative of a field closing character, third means for storing second signals representative of said pseudo queue field identifier character in said first address location, and fourth means for storing said second signals in said second address location of a scratch pad memory.

2. The document processing system of claim 1 wherein said arithmetic logic unit means is responsive to a succession of said translated character signals in said first state for providing means for generating signals representative of said start position character count when a first of said succession of said translated character signals having said selected one of said translated character signals in said first state is received, and providing counting means responsive to said succession of said translated character signals in said first state for generating signals representative of said end position character count.

3. The document processing system of claim 2 wherein said scratch pad memory means further includes fifth means for storing said start position count signals in a third address location, and sixth means for storing said end position count signals in a fourth address location of said scratch pad memory.

4. The document processing system of claim 3 wherein said arithmetic logic means includes means for checking said translated character signals and said character identifier signals for generating signals indicative of the number of illegal characters in said field, said checking means further providing means for generating signals indicative of the number of said illegal characters being less than a predetermined value.

5. The document processing system of claim 4 wherein said checking means further includes means for generating signals indicative of the character positions of said illegal characters in said field.

6. The document processing system of claim 5 wherein said scratch pad memory means further includes seventh means for storing said signals indicative of the character position of said illegal characters in a fifth address location of said scratch pad memory.

7. The document processing system of claim 6 wherein said scratch pad memory means further includes the eighth means for storing said character position signals indicative of the character position of a first of said illegal characters in said field in a sixth address location of said scratch pad memory.

8. The document processing system of claim 7 wherein said scratch pad memory means further includes ninth means for storing said character position signals indicative of the character position of a second of said illegal characters in said field in a seventh address location of said scratch pad memory.

9. The document processing system of claim 8 wherein said scratch pad memory means further includes tenth means for storing said character position signals indicative of the character position of a third of said illegal characters in said field in an eighth address location of said scratch pad memory.

10. The document processing system of claim 9 wherein said arithmetic logic unit means provides eleventh means responsive to said translated character signals representative of said queue field identifier character for transfer of said first, second, third, fourth, fifth, sixth, seventh and eighth address location signals to said main memory for processing by a central processor unit.

11. The document processing system of claim 10 wherein said arithmetic logic unit means provides twelfth means responsive to said character identifier signals representative of said pseudo queue field identifier character for transfer of said first, second, third, fourth, fifth, sixth, seventh and eighth address location signals to said main memory for processing by a central processor unit.

12. The document processing system of claim 11 wherein said predetermined value is four.

* * * * *